(12) United States Patent  
Kumamoto

(10) Patent No.: US 7,409,330 B2  
(45) Date of Patent: Aug. 5, 2008

(54) METHOD AND SYSTEM FOR SOFTWARE DEBUGGING USING A SIMULATOR

(75) Inventor: Danny N. Kumamoto, Cedar Park, TX (US)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 11/154,315

(22) Filed: Jun. 16, 2005

(65) Prior Publication Data

US 2007/0011656 A1 Jan. 11, 2007

(51) Int. Cl.
*G06F 9/45* (2006.01)
(52) U.S. Cl. .......................... 703/22; 703/21; 717/124; 717/128; 714/822; 714/38
(58) Field of Classification Search .............. 703/22, 703/21, 17; 717/124, 128; 714/822, 38; 710/261; 712/233; 716/1
See application file for complete search history.

(56) References Cited

U.S. PATENT DOCUMENTS

| | | | |
|---|---|---|---|
| 5,446,900 | A | 8/1995 | Kimelman |
| 5,652,869 | A | 7/1997 | Herdeg et al. |
| 5,892,941 | A | 4/1999 | Khan et al. |
| 5,943,498 | A | 8/1999 | Yano et al. |
| 5,983,017 | A | 11/1999 | Kemp et al. |
| 6,173,386 | B1 | 1/2001 | Key et al. |
| 6,179,488 | B1 | 1/2001 | Wilson |
| 6,188,975 | B1 | 2/2001 | Gay |
| 6,219,782 | B1 | 4/2001 | Khan et al. |
| 6,397,242 | B1 | 5/2002 | Devine et al. |
| 6,496,847 | B1 | 12/2002 | Bugnion et al. |
| 6,550,056 | B1 | 4/2003 | Mizumoto et al. |
| 6,751,583 | B1* | 6/2004 | Clarke et al. ................. 703/17 |
| 7,275,246 | B1* | 9/2007 | Yates et al. ................. 718/100 |
| 2003/0070117 | A1* | 4/2003 | Matsuki et al. ............... 714/25 |
| 2003/0177476 | A1* | 9/2003 | Sarma et al. ................ 717/128 |
| 2004/0088462 | A1* | 5/2004 | Miyake et al. .............. 710/261 |
| 2005/0027973 | A1* | 2/2005 | Barry et al. ................. 712/233 |
| 2005/0034102 | A1* | 2/2005 | Peck ........................... 717/124 |
| 2005/0143968 | A9* | 6/2005 | Odom et al. .................. 703/21 |
| 2005/0289514 | A1* | 12/2005 | Hooper et al. .............. 717/124 |
| 2006/0117274 | A1* | 6/2006 | Tseng et al. ................... 716/1 |
| 2006/0248436 | A1* | 11/2006 | LaFrance-Linden ........ 714/822 |
| 2006/0282707 | A1* | 12/2006 | Rosenbluth et al. ........... 714/38 |

OTHER PUBLICATIONS

Bouchhima et al., "Fast and Accurate timed execution of high level embedded software using HW/SW interface simulation model", IEEE, 2004.*

Uhlig et al., "Trace-driven memory simulation: A survey", ACM 1997.*

Rosenblum et al., "Using the SimOS machine simulator to study complex computer systems", ACM, 1997.*

Hutchings et al., "Developing and debugging FPGA Applications in Hardware with JHDL", IEEE 1999.*

* cited by examiner

*Primary Examiner*—Paul L Rodriguez
*Assistant Examiner*—Kandasamy Thangavelu
(74) *Attorney, Agent, or Firm*—Sprinkle IP Law Group

(57) ABSTRACT

Systems and methods for debugging software and/or hardware are disclosed. A processor may execute a program for a certain amount of time. The context of the processor at the end of that time may then be made available to a simulator operable to simulate the processor. The program can then be executed from that point on the simulator using the context. Additionally, a context resulting from the execution of the program on the simulator may result and be restored to the processor for continued execution.

23 Claims, 7 Drawing Sheets

METHOD AND SYSTEM FOR SOFTWARE DEBUGGING USING A SIMULATOR

TECHNICAL FIELD OF THE INVENTION

The invention relates in general to methods and systems for debugging software, and more particularly, to methods and systems for debugging software on a simulator.

BACKGROUND OF THE INVENTION

Embedded systems are special purpose or customized devices controlled by a computer system through software application programs and hardware drivers which run on some form of operating system. Through software control these embedded systems are customized to provide a variety of features, forming a very broad market for these devices. For example, embedded systems include personal information managers, set-top boxes for cable, satellite, and Internet TV, or any smart device created using a computer system such as a smart dishwasher. An embedded system may be any device having a processor and peripheral hardware run under software control.

A typical process flow for developing an embedded system includes a software design flow and a hardware design flow where both flows develop separately according to a common specification. The testing and verification of software typically do not occur until a suitable hardware prototype, such as through an ASIC, (Application Specific Integrated Circuit), is created at the hardware creation stage. Waiting to test the software and hardware portions until a hardware prototype has been created extends the overall design cycle if re-work is required to make the software and hardware components compatible with each other.

One method known for detecting design flaws early in the process integrates the development of the software and hardware by performing software debugging and verification before an actual working hardware prototype is completed. This approach provides the opportunity for a shorter time to market and higher product quality since testing may be accomplished through either a hardware or a software solution (or both), and before any time and money is spent developing a physical implementation that may not be compatible with the software components developed.

Typically, a software debug session is performed in a single executing environment. That is, a particular debug session is typically performed entirely either on actual hardware, a hardware tool, or a simulator. Debugging can include anything required to bring any software and/or hardware up to operating mode dependability. Thus, debugging is a process of detecting, locating, and correcting a problem in a software program and/or hardware. Further, a software program which does not provide a desired result may be said to have a bug, even when debugging such a program may result in making no changes to the actual instructions, or software program, itself. Thus, debugging software can include identifying faulting instructions and simply changing context to enable further execution of instructions.

Debugging software using hardware tools like an in-circuit emulator (ICE) or scan based debugger (like RISCWatch) can be expensive. Thus, it may be cost prohibitive to provide hardware-debugging tools for all developers, or even for all testers. Further, a given hardware tool may slow down the execution of the software. For example, it may take more time to reproduce a problem on a hardware tool than if the same program ran on the real hardware. Furthermore, if multiple processors have to be debugged simultaneously, accurately reproducing a problem may be virtually impossible using some debugging tools.

Alternately, the software may be debugged using a simulator. A simulator may be, for example, either a functional or cycle accurate simulator, or some combination of the two. A simulator can provide very detailed internal state information and fine control when interacting with multiple processors. This is especially true when interacting with multiple Instruction Set Architectures, or ISAs. However, debugging software exclusively on a simulator can be problematic. For example, the debugging may be very time consuming. That is, if the problem(s) appear after running the software program on hardware for a significant time such as several minutes or hours, the same problem(s) may not be encountered on a simulator for a translated significant time of hours or days.

An emulator (especially those which are FPGA-based, such as Quickturn or Aptix) provides an environment for detailed debug of the hardware, much like the simulator environment. An emulator is significantly faster (e.g., by two or more orders of magnitude) than a simulator but may come with a steep price tag (i.e., specialized hardware may be required).

Thus, each executing environment has associated benefits and limitations. Although actual hardware may execute the fastest, it may not yield much information about the execution of the program other than whether or not the program terminates prematurely. Hardware tools are expensive, may slow down software execution, and are limited in their ability to debug multiple processors simultaneously. Software simulators may execute very, very slowly and may be limited in their ability to exactly replicate hardware functionality. Hardware emulators may be faster than simulators; however they may also be even more expensive than hardware tools. It may therefore be desirable to perform debug using more than one executing environment.

Accordingly, a need exists whereby detailed debug may be performed less expensively and faster than current methods, systems, and devices allow. Further, a need exists whereby software debug may be performed interchangeably among actual hardware, hardware tools, emulators, and simulators. The various advantages and disadvantages are summarized in TABLE 1 below:

TABLE 1

| DEBUG METHOD | COST PER DEVELOPER | DEBUG SPEED | DEBUG DETAIL & DEBUG CONTROL |
| --- | --- | --- | --- |
| HARDWARE | cheaper | fastest | least |
| HW TOOLS | expensive | faster | less |
| FPGA-BASED EMULATOR | most expensive | slower | more |
| SIMULATOR | cheapest | slowest | most |

SUMMARY OF THE INVENTION

Systems and methods for debugging software and/or hardware are disclosed. A processor may execute a program for a certain amount of time. The context of the processor at the end of that time may then be made available to a simulator operable to simulate the processor. The program can then be executed from that point on the simulator using the context. Additionally, a context resulting from the execution of the program on the simulator may result and be restored to the processor for continued execution.

In one embodiment, a software program executing on a processor is halted and the resulting context provided to a simulator. The simulator simulates the processor and executes the software program on the simulated processor using the context. The software program may then be debugged using the simulator. After the program has been debugged, another context exists in the simulated processor. This context may be restored into the actual processor and execution of the software program continued on the processor using this context.

In another embodiment, when the software program is being debugged on the simulator another software program may be executed on the actual processor.

In some embodiment, the contents of memory may also be provided to the simulator. The content may be provided to the simulator by transferring control of one or more sections of memory to the simulator, or by treating memory as a virtual file system and mapping one or more sections of memory to the simulator.

The invention may provide the technical advantage that coprocessors may be freed up for other processing while software is being debugged. In addition by using a simulator internal states or other trace information can be recorded, the internal states of a simulated processor can be modified while debugging, and core dump files can be read in and execution of a software program continued on the simulator.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements will become apparent to those skilled in the art from this disclosure which do not depart from the scope of the appended claims.

Before discussing specific embodiments of the present invention, a nonlimiting, exemplary architecture for use describing embodiments of the present invention is presented. For purposes of illustration, the architecture will be described in connection with a single processing element of a single microprocessor. Though this exemplary architecture is utilized in conjunction with the description of the various examples described herein, after reading this specification skilled artisans will appreciate that the systems and methods can be applied equally well to any other type of architecture, including similar architectures where different functions are performed in different semiconductor devices etc.

Figure 1:
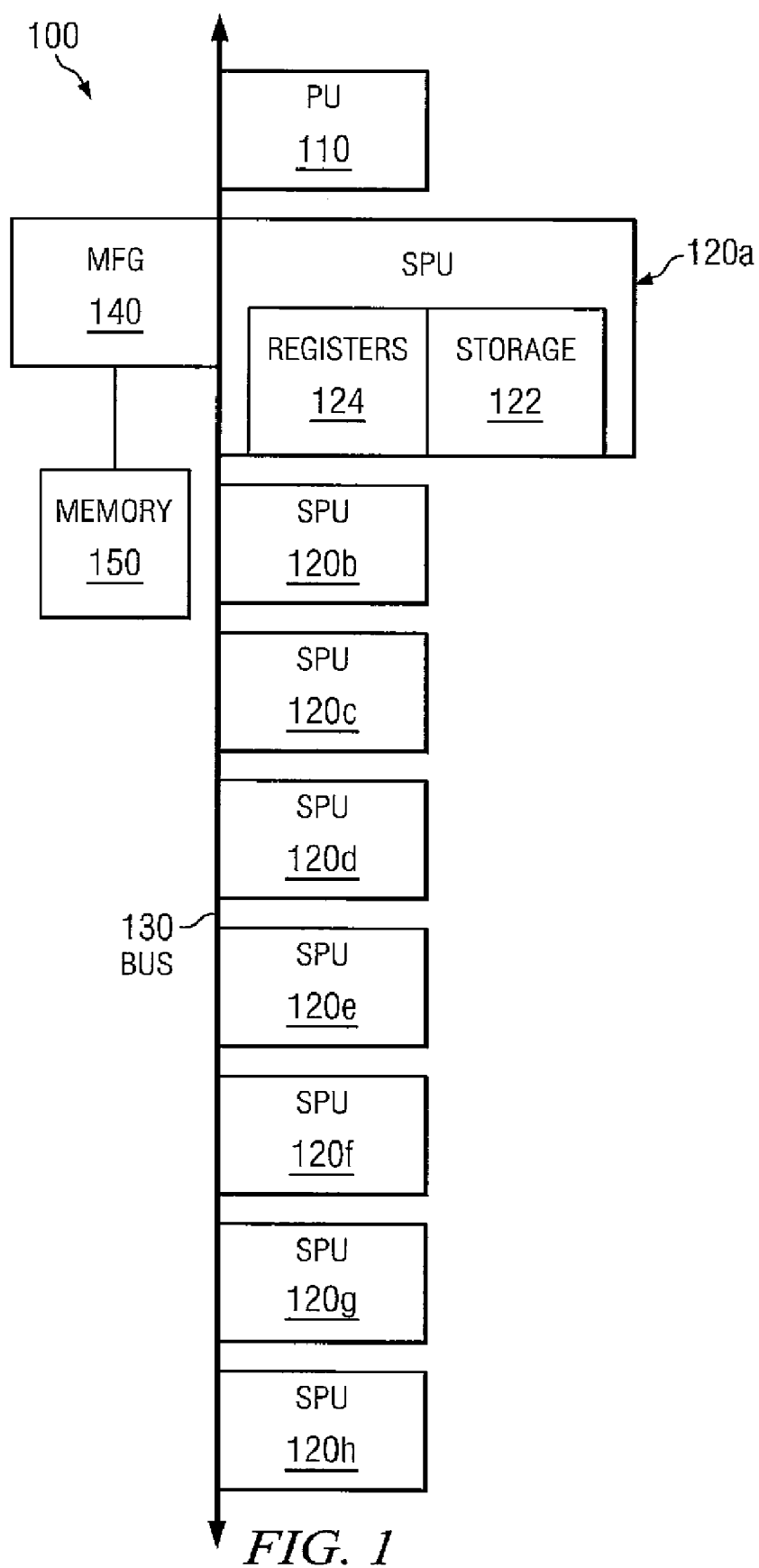
FIG. 1 is a block diagram of an embodiment of a broadband engine.

Certain microprocessors may consist of a number of processing elements. An embodiment of one type of processing element is depicted in FIG. 1. Processing element 100 consists of a number of processors 110, 120 interconnected by bus 130. One of these processors 110 may serve as a main processor, also referred to as a Processing Unit, or PU 110. Typically, a PU has a cache and may directly access system memory 150 through memory flow controller (MFC) 140 and executes program code using system memory 150 and logic internal to PU 110, such as registers etc. Context as used when referring to PU 110 will be used to refer to the state of any set or subset of the internal logic of PU 110. In one embodiment, PU 110 is a PowerPC core.

PU 110 will also typically coordinate a number of Synergistic Processing Units (SPU) 120, or coprocessors, so that SPUs 120 may each execute a different set of instructions simultaneously. SPUs 120 may have local storage 122, registers 124. Typically, when SPUs 120 execute a set of instructions they do not access system memory 150. Coprocessors, or SPUs 120, may have internally all context required for processing, thus the execution of instructions within SPUs 120 can occur internally to SPU 120 using logic internal to SPU 120 such as local storage 122 to store instructions and data, registers 124, floating point unit 126, integer unit 128 etc. Executing such a program on SPU 120 generates a context, which may include any set or subset of the internal state of SPU 120, including the program itself, data, internal states, program memory, and any register state information. Context as used when referring to SPU 120 will also be used to refer to the state of any set or subset of the internal logic of SPU 120, including local storage 122, registers 124, floating point unit 126, integer unit 128 etc.

SPUs 120 may also utilize system memory 150 when executing instructions. In this event, a section of system memory 150 may be accessed by SPU 120 through MFC 140 and utilized during execution of instructions. In one particular embodiment, SPU 120 may have a section of system memory 150 assigned to it, and designated for exclusive use by SPU 120.

Occasionally, a program executing on PU 110 or SPU 120 will have a bug. As mentioned above, utilizing traditional hardware or software debug methodologies to debug the software program on PU 110 or SPU 120 itself can be time consuming and inefficient, slowing the execution of software on the PU 110, other SPUs 120, or in the entire processing element 100. What is desired is a method of debugging software that is less time consuming, and may allow the hardware which was executing the software to be freed for other uses.

Attention is now directed to systems and methods for debugging software on a simulator. A processor may execute a program for a certain amount of time. The context of the processor at the end of that time may then be made available to a simulator operable to simulate the processor. The program can then be executed from that point on the simulator using the context.

The ability for a simulator to execute from a particular point using a context can be used to great advantage when debugging programs. For example, a program may be halted at a user-definable time. Such a user-defined time may be just prior to a known failing instruction or bug. As used herein a bug may be any condition or situation that prevents the software code from performing as desired or as intended, including any combination of errors in the code, incompatibilities of the code with other code or hardware, hardware errors, or malfunctions caused by timing leads or lags etc.

Thus, a program executing on SPU 120a may be executed to a point just before a bug is imminent. The context at this point may be made available to a simulator running on SPU 120b configured to simulate an SPU 120. The program may then be executed from that point onward using the simulator executing on SPU 120b, and the program debugged. After the program is debugged, another context exists in the simulator. Context used with respect to a simulator is intended to mean the context of the processor being simulated. This context, or the original context provided to the simulator, may be restored back into SPU 120a and the execution of the program resumed.

Using a simulator for debug may provide a number of advantages. For example, by using a simulator it may be possible to record internal states or other trace information, or to even modify internal states while debugging. Such recorded information may include, for example, processor check pointing functionality. Furthermore, a simulator may be able to journal, or keep records of all memory and IO, or Input/Output, access. Such journaling may provide the possibility to expand the debugging capabilities of a simulator by, for example, allowing undo command or other means to be able to step back in processing time. Simulator may also mimic behaviors of the hardware, valuable to the program running under simulation (like the delay of accessing the system memory 150) using the data gathered on real hardware and played back while running simulation: For example, since bus 130 is commonly shared across multiple programs (running in a multi-task environment), the bandwidth of bus 130 used by other programs can be recorded and then replayed in the simulator such that the data transfer between PU 110 and memory 150 can reflect hardware environment (i.e., simulate bus 130) even while the program is running under the simulator.

Figure 2:
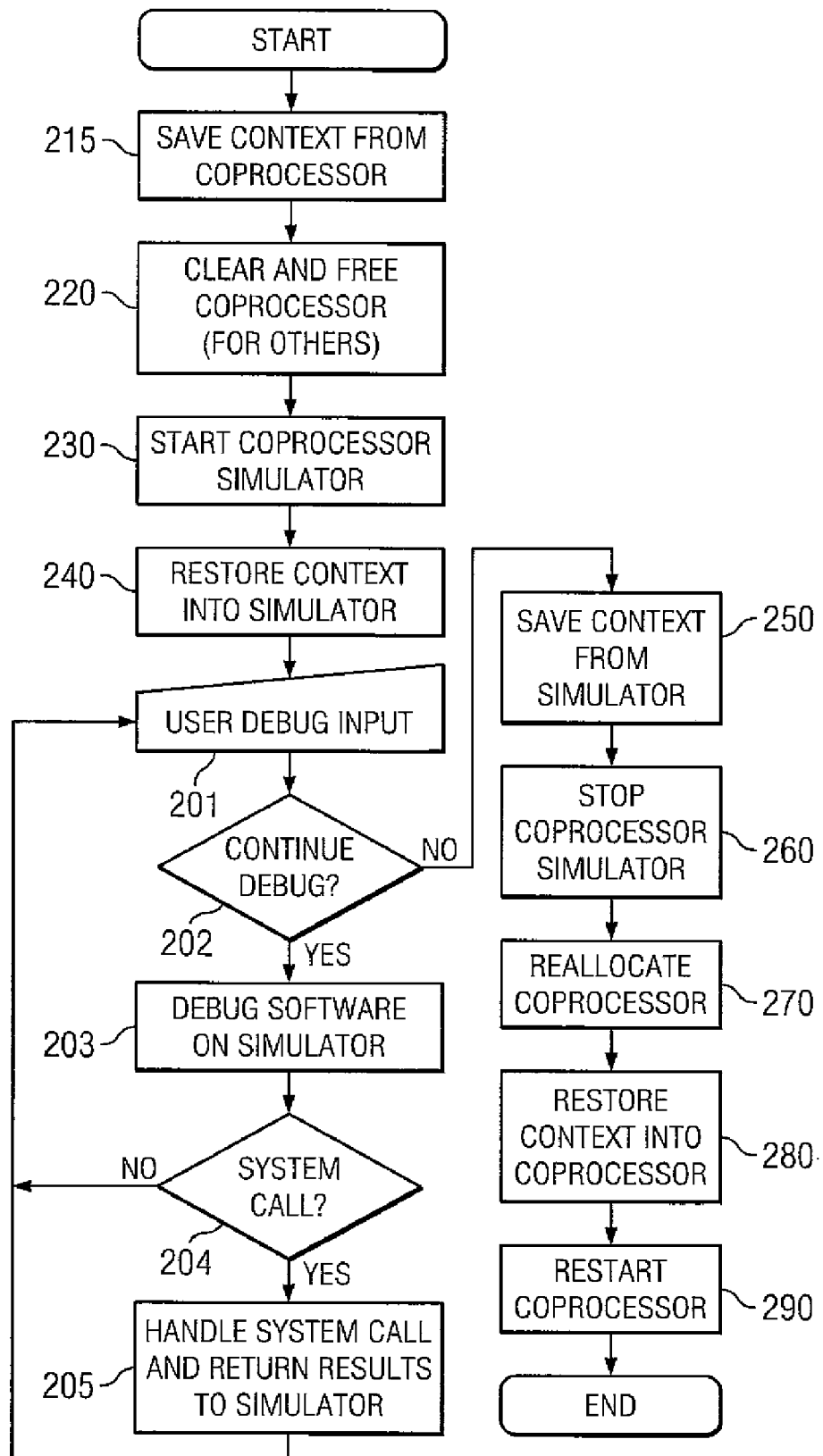
FIG. 2 is a flow chart of an embodiment of a debug session of one processor from an Operating System's point of view.

Turning now to FIG. 2, a flow chart for one embodiment of a method for debugging programs on a simulator is depicted. Flow chart 200 depicts a debug session from the point of view of an Operating System, or OS. That is, functionality of an OS is illustrated and will be described as it relates to the embodiment of the method for debugging programs.

A program may be executed on an SPU 120 to a point before the occurrence of an imminent bug. Halting of the program may be accomplished by the deliberate insertion of a halt instruction into the lines of programming code, or any other means known in the art. At this point a context is resident on the SPU 120. At step 210 this context may be saved to a memory and SPU 120 freed at step 220 so that it may be utilized to execute other programs. That is, a means exists within the hardware and/or software whereby context may be maintained in such a way as to be usable by an alternate executing environment, which may be a debug environment including a simulator executing on another processor. Context may be either transferable to another executing environment, or means by which to make context otherwise available to another executing environment may exist. Such context may include program instructions, stacks, data, registers, memory and any other data or information.

A simulator operable to simulate SPU 120 may then be started at step 230. This simulator may be executed on another SPU 120 or any other location. The other SPU 120 may be allowed to finish any processing it may have been assigned before the simulator is started (step 230). After the simulator is started (step 230), the context saved at step 210 may be made available to the simulator at step 240, for example by copying the context directly from SPU 120 to the simulator. The program may then be executed on the simulator using the context.

At steps 201-205 a debug loop may be performed to debug the program using the simulator. At step 201 user input is provided, such as initiating the debugger or commands to read certain program state or registers. A decision is made whether to terminate the debug flow as step 202. If the debug is to continue, the simulator may execute one or more instructions of the program in order that a user may debug the program at step 203. If one of these instructions is a system call, this system call may be passed to an OS which handles the system call and returns the result of the system call to the simulator at step 205. Debug loop (steps 201-205) may then continue.

At some point, the debug loop (steps 201-205) may be stopped at step 202, for example, if the bug is found, or for any other reason. When the decision is made to stop the debug loop at step 202, the current context resulting from executing program instructions on the simulator may be saved from the simulator at step 250 and the simulator stopped at step 260. SPU 120, on which the simulator was running, may then be reallocated for another use at step 270. A context may then be restored into SPU 120 on which the program was originally executing and SPU 120 restarted at steps 280 and 290. It should be noted that the context restored at step 280 may be any context including the original context that was saved at step 210, or may be the context saved after the program was debugged on the simulator at step 250.

Step 205 can include the program writing out to or reading in from an IO peripheral (e.g., hard disk) or system memory. These external interactions can be preserved with the given context of the program/processor state. This will allow the ability for the simulator to log (or journal) the execution such that it would be possible to replay the debug session or even create a regression test suite (e.g., to test the hardware, the simulator, the program itself, the libraries from which the program depends or even the operating system).

Figure 3:
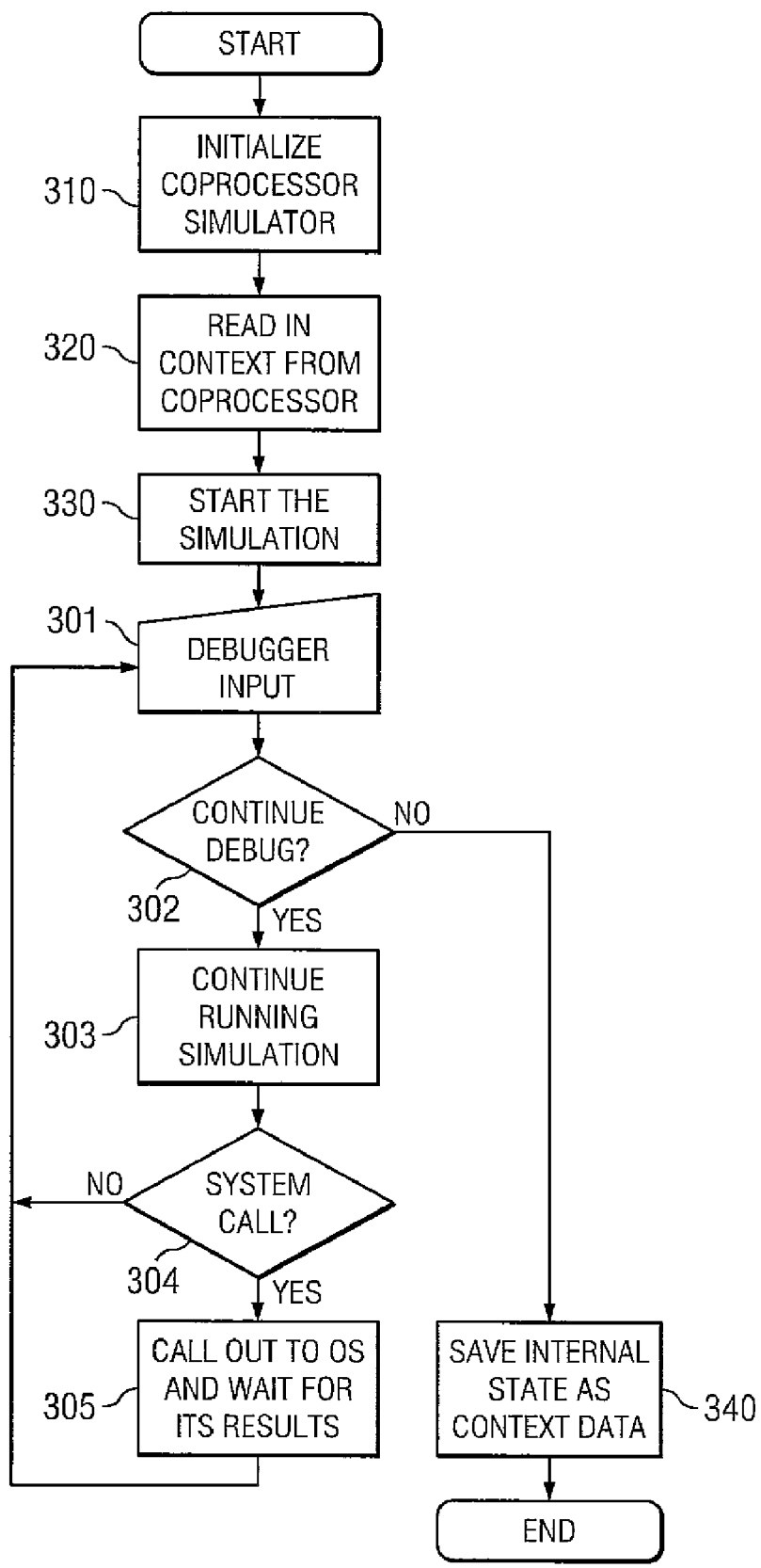
FIG. 3 is a flow chart of an embodiment of a debug session of one processor from a debug environment's point of view.

Moving to FIG. 3, a flow chart for one embodiment of a method for debugging programs on a simulator is depicted. Flow chart 300 depicts a debug session from the point of view of a simulator. A simulator operable to simulate an SPU 120 may be initialized on an SPU 120 at step 310. At step 320 a context may be read into the simulator. This context may be the result of halting a program executing on another SPU 120 as described above with respect to FIG. 2.

After the context is read in (step 320), the simulator may begin simulating the operation of SPU 120 with the context at step 330. At steps 301-305 a debug loop may be performed to debug the program which originally generated the context using the simulator. At step 301 input may be accepted, such as user input for initiating the debugger or commands to read certain program state or registers. A decision is made whether to terminate the debug flow as step 302. If the debug is to continue, the simulator may execute one or more instructions of the program in order that a user may debug the program at step 303. If one of these instructions is a system call, the simulator may pass the system call to an OS at step 304 and wait for the result of the system call to be returned to the simulator at step 305. Debug loop (steps 301-305) may then continue.

Alternately, at step 304 the system call may also be handled inside the simulator such that step 305 would mimic an OS behavior rather than sending and waiting for an OS to respond. As just some examples, this mimicked behavior can include repeating the results from a journal file, and/or giving some reasonable response, and/or fully running the OS code inside the simulator. Fully running the OS code inside the simulator may be performed either by direct execution or by simulated execution. However, such simulated execution may be difficult or even impossible. For example, simulated execution may not be possible if the simulator runs SPU 120 executables and the OS code is a PU 110 executable.

At some point, the debug loop (steps 301-305) may be stopped at step 302, as for example, if the bug is found, or for any other reason. When the debug loop is stopped at step 302, the current context of the simulator resulting from executing program instructions during the debug loop (steps 301-305) on the simulator may be saved from the simulator at step 340 and the simulator stopped. The SPU 120 on which the simulator was running may then be reallocated for another use.

While embodiments of the methodologies depicted with respect to FIG. 2 and FIG. 3 may be applied to debug software on a simulator using solely the context of SPU 120, occasionally it may be desirable to utilize the context of PU 110 with other SPUs 120 when debugging a program. That is, the context of associated SPUs 120 may affect the execution of a program on a PU 110. Additionally, it may be desirable to utilize some or all of the contents of memory 150 when debugging a program. It may be desirable to utilize memory 150 because a PU program may use the system memory 150 for both program and data. Thus, both program and data may be copied or reassigned to the simulator.

For example, programs executing on SPUs 120 and PU 110 may be halted at a user-definable time. Such a user-defined time may be just prior to a known failing instruction or bug in one particular program.

Thus, a program which is to be debugged may be executed on PU 110 or SPU 120 to a point just before a bug is imminent. Programs executing on other processors (PU 110 and/or SPU 120) may be stopped at substantially the same point. The contexts from PU 110 and related SPUs 120 at this point may then be made available to a simulator configured to simulate all the processors along with the contents of main memory 150. The program to be debugged may then be executed from that point onward using the simulator, and then debugged. One advantage of using a simulator for debug in this case may be that a simulator allows the simulation of PU 110 and all SPUs 120 to be stepped through using one debugger command at a time. Another advantage of using a simulator for debug in this case may be that a simulator allows one break point to stop all simulated PU 110 and SPU 120 execution. Hardware is not normally designed to support these advantageous behaviors, consequently such debugging may be performed only on a simulator. After the program is debugged, the context may be restored back into PU 110 and SPUs 120.

Figure 4:
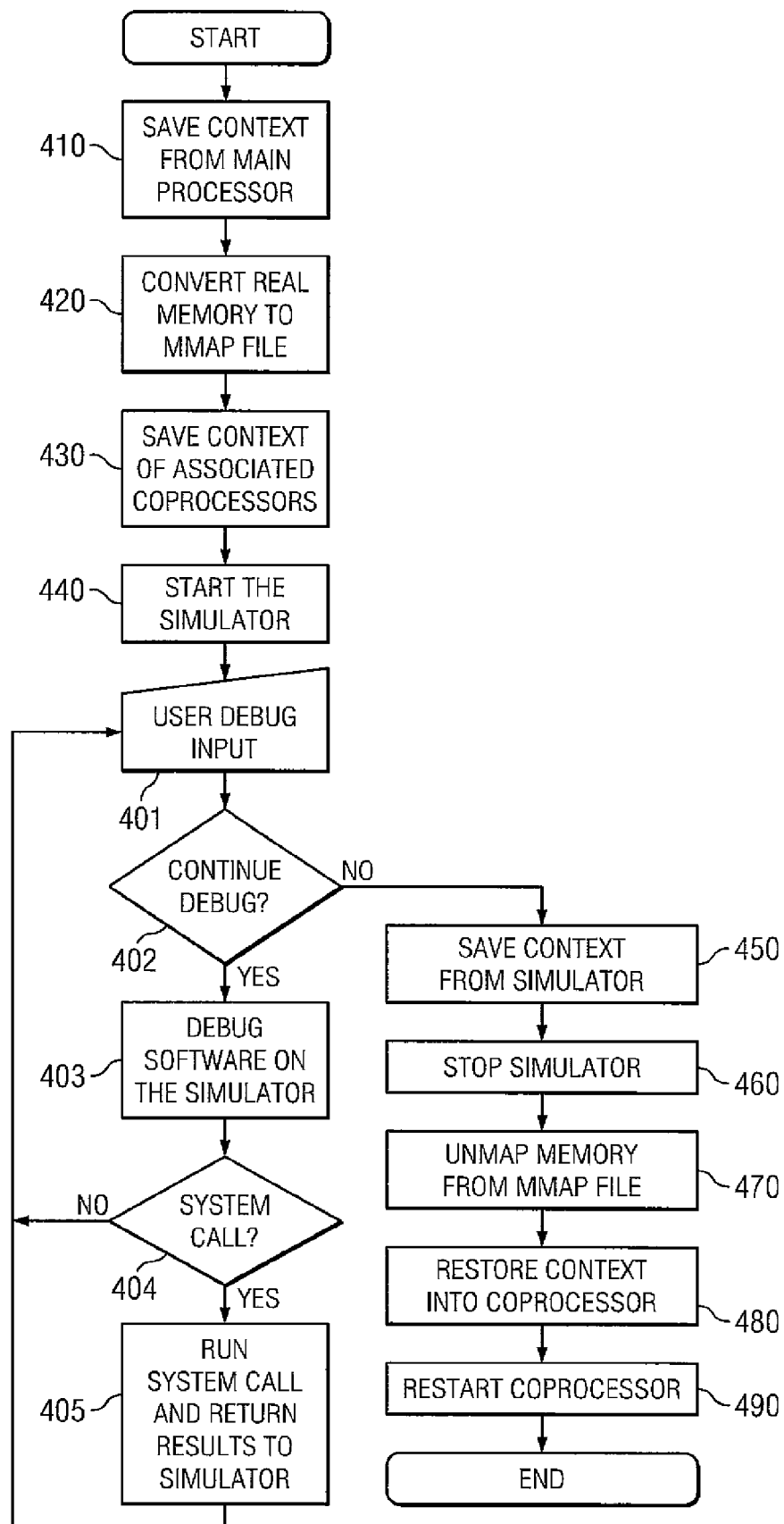
FIG. 4 is a flow chart of an embodiment of a debug session of multiple processors from an Operating System's point of view.

In FIG. 4 a flow chart for one embodiment of a method for debugging programs on a simulator using the context from associated PU 110 and SPUs 120 along with the contents of main memory 150 is depicted. Flow chart 400 depicts a debug session from the point of view of an Operating System, or OS. That is, functionality of an OS is illustrated and will be described as it relates to the embodiment of the method for debugging programs.

A program to be debugged may be executed on a PU 110 (or SPU 120) to a point before the occurrence of an imminent bug, as described above. Programs executing on associated PU 110 and/or SPUs 120 may be halted at substantially the same point. At this point a context is resident on each PU 110 and SPU 120s. At step 410 the context from PU 110 on which the program to be debugged was executing may be saved to a memory. It may also be desirable to provide the contents of main memory 150 to the simulator. In some embodiments, the simulator may interact directly with MFC 140 to access the contents of memory 150 (memory 150 could be treated as shared memory so that more than one program can access the same memory)—that is step 420 can be skipped. In other embodiments, however, the contents of main memory 150 may be converted to an mmap file at step 420 allowing the operating system kernel to treat main memory as a file system—which can latter be re-mapped by the simulator. The context of associated SPUs 120*b-h* can then be saved at step 430. Still another embodiment would be to have the contents of all the memory 150 being used by program(s) on PU 110 (and/or SPU 120) copied into the memory space of the simulator.

A simulator operable to simulate PU 110 and SPUs 120 may then be started at step 440. This simulator may be executed on another PU 110 or SPU 120 or any other location. If a simulator is to be run on an SPU 120, the SPU 120 may be allowed to finish any processing it may have been assigned before the simulator is started (step 440). After the simulator is started (step 440), the contexts saved at step 410 and step 440 may be made available to the simulator, for example by copying the contexts directly from PU 110 and SPUs 120*a-h* to the simulator, by providing core dump files, by making the sections of main memory 150 where the contexts are saved available to the simulator, etc. The content of main memory 150 may also be made available to the simulator, for example by allowing the simulator to map a virtual file system into its memory model using the mmap file created at step 420.

In one embodiment, this is done using a modified version of a Cell Processor simulator named "Mambo". More specifically, the Mambo simulator and a Linux Kernel are modified to allow mmap'ing the main memory 150 into Mambo simulator. The Kernel will treat the main memory as a file system while Mambo will map the virtual file system into its memory model. The program may then be executed on the Mambo simulator at step 440 using the contexts and/or the content of main memory 150.

At steps 401-405 a debug loop may be performed to debug the program using the simulator. At step 401 user input is provided, such as initiating the debugger or commands to read certain program state or registers. A decision is made whether to terminate the debug flow as step 402. If the debug is to continue, the simulator may execute one or more instructions of the program in order that a user may debug the program at step 403. If one of these instructions is a system call, this system call may be passed to an OS which handles the system call and returns the result of the system call to the simulator at step 405. Debug loop (steps 401-405) may then continue.

Alternatively, at step 405, in case the system call is for interacting between two or more elements of the processors (for example, communications between two SPU 120a & 120g), rather than sending the request to the Kernel, it may be more effective if the Kernel code behavior was either simulated by the simulator or a copy of the Kernel executed inside the simulator. When this type of situation occurs, the system call from SPU 120a may be handled completely inside the simulator or externally by the Kernel. If external, the Kernel may know about the simulated SPU 120a-h and where the system call is coming from so that Kernel will interact with the simulated SPU 120g (rather than the hardware SPU 120g) correctly. If internal, then it can be a simulated behavior or actually run Kernel code inside the simulator. If simulated behavior, the simulator will mimic like the Kernel in letting the two SPUs interact as if they were going through the Kernel. If running Kernel code inside the simulator, then enough code of the Kernel may be made available to run on the simulator with specialized initialization specifically for the simulator.

At some point, the debug loop (steps 401-405) may be stopped at step 402, as for example, if the bug is found, or for any other reason. When the decision is made to stop the debug loop at step 402 a context for PU 110 and associated SPUs 120a-h along with an mmap file exists as the result of executing program instructions on the simulator. These may be saved from the simulator at step 450 and the simulator stopped at step 460. Main memory 150 may be restored by, for example, unmapping the memory for the mmap file as step 470, and the contexts restored into PU 110 and each of the SPUs 120a-h at step 480. The PU 110 and SPUs 120a-h can then be restarted at steps 490. It should be noted that the file unmapped at step 470 and the context restored at step 480 may be any context or mmap file including the original contexts and mmap files that were saved at steps 410-430, or may be the contexts and mmap files saved after the program was debugged on the simulator at step 450.

Figure 5:
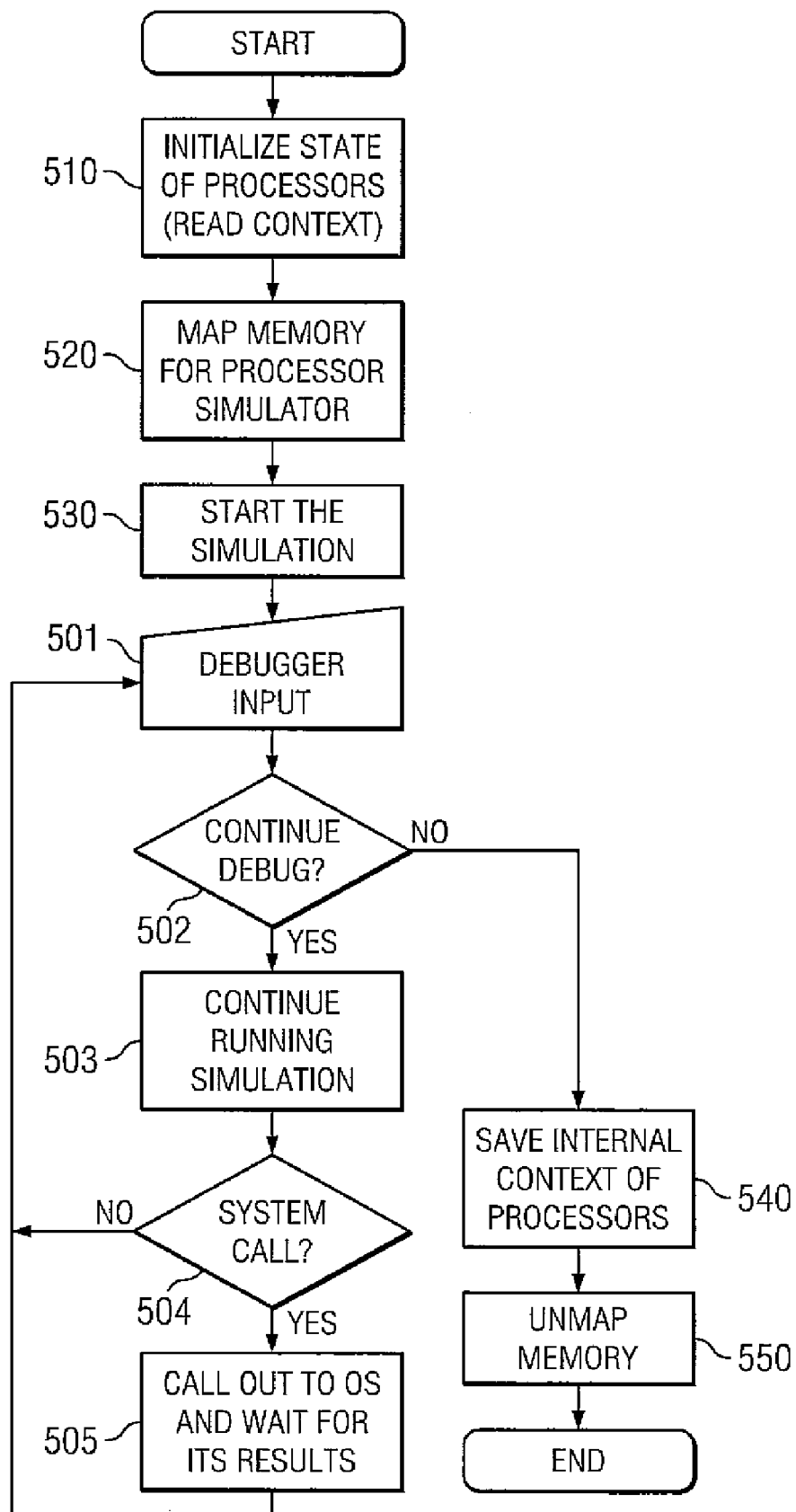
FIG. 5 is a flow chart of an embodiment of a debug session of multiple processors from a debug environment's point of view.
Figure 6A:
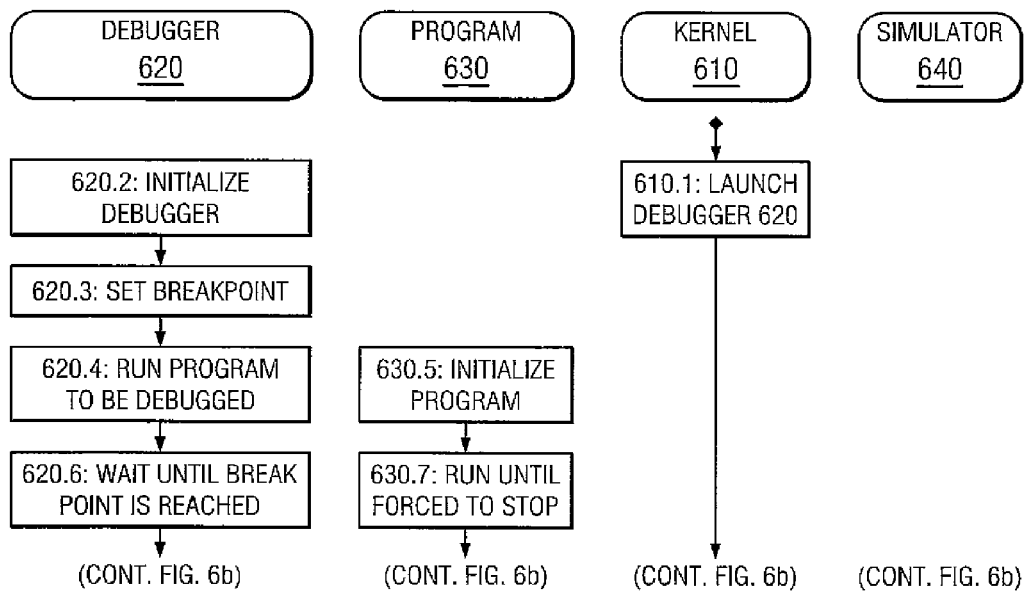
FIGS. 6A-D are a flow chart of an embodiment of a debug session which includes the embodiments of debug sessions illustrated by FIG. 4 and FIG. 5.
Figure 6B:
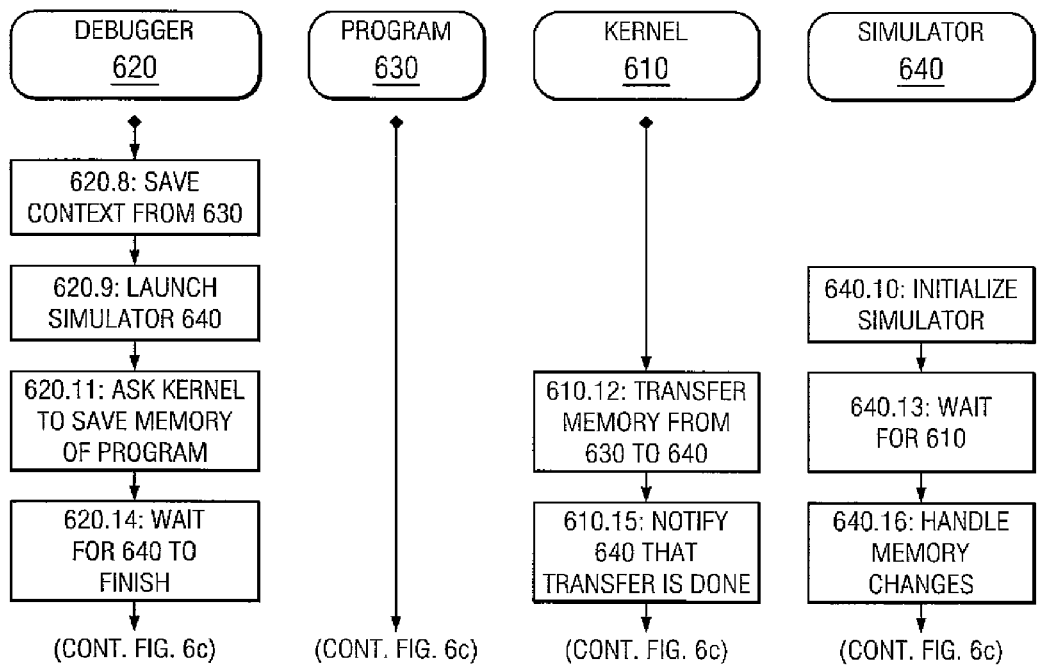
Figure 6C:
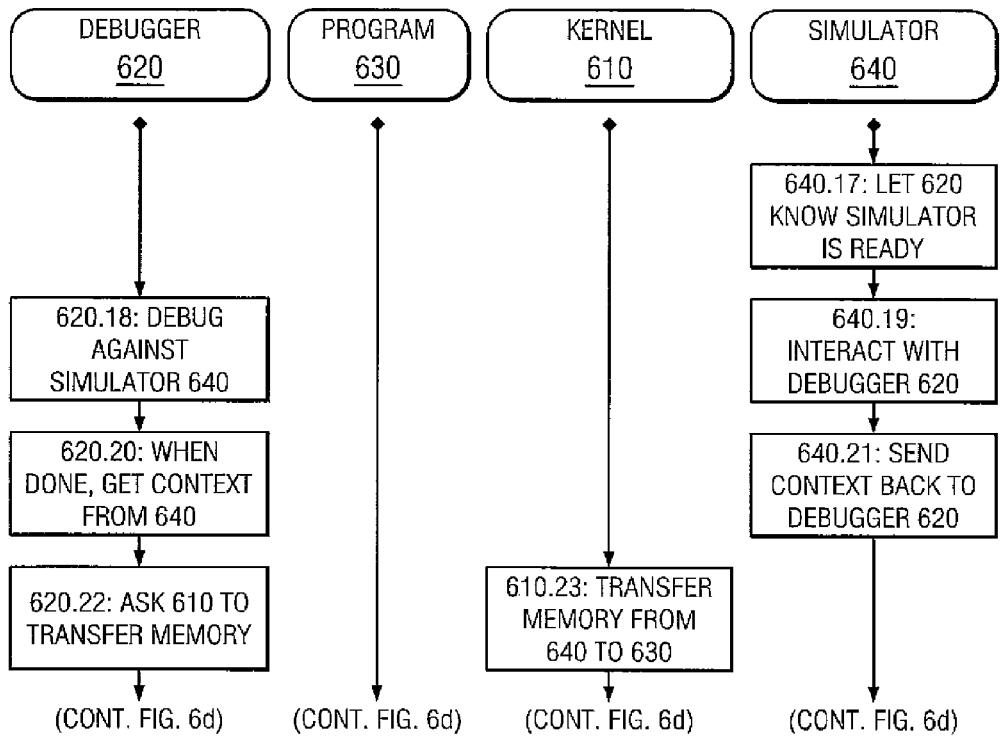
Figure 6D:
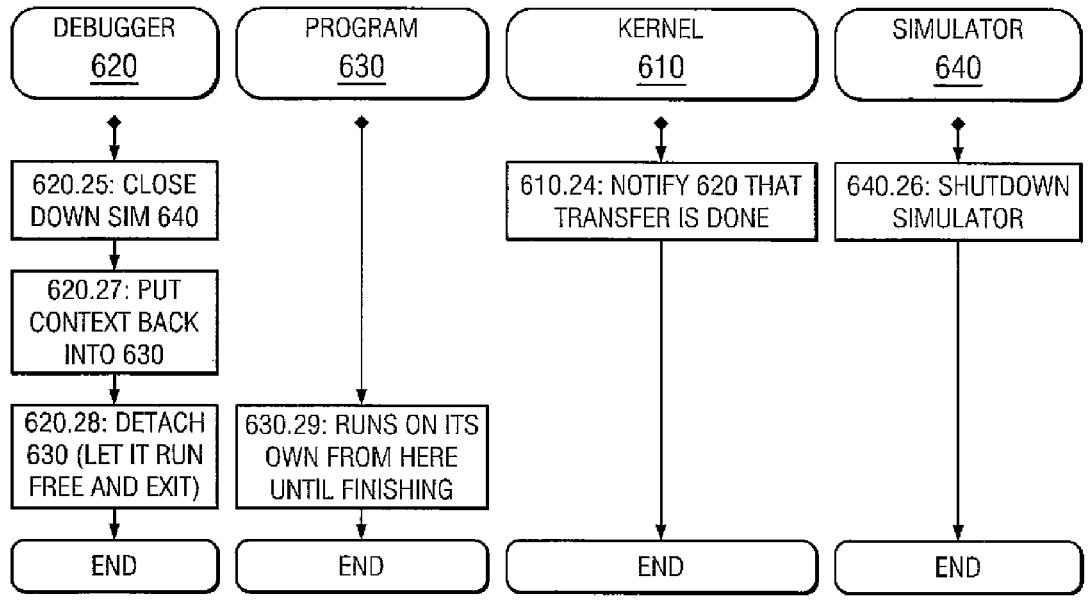

Moving to FIG. 5, a flow chart for one embodiment of a method for debugging programs on a simulator is depicted. Flow chart 500 depicts a debug session from the point of view of a simulator. A simulator operable to simulate an PU 110 and multiple SPU 120's may be initialized on an PU 110 and one or more contexts may be read into the simulator as step 510. This context may be the result of halting a program executing on a PU 110, and/or contexts saved from other associated SPUs 120a-h, as described above. The simulator can also map memory at step 520. In one embodiment, Mambo simulator may be used to map an mmap file into the memory model of the simulator.

After the contexts are read in and the memory mapped (steps 510 and 520), the simulator may begin simulating the operation of PU 110 and SPU 120's with the contexts and memory at step 530. At steps 501-505 a debug loop may be preformed to debug the program which originally generated the context using the simulator. At step 501 input may be accepted, such as user input for initiating the debugger or commands to read certain program state or registers. A decision is made whether to terminate the debug flow as step 502. If the debug is to continue, the simulator may execute one or more instructions of the program in order that a user may debug the program at step 503. If one of these instructions is a system call, the simulator may pass the system call to an OS at step 504 and wait for the result of the system call to be returned to the simulator at step 505. Debug loop (steps 501-505) may then continue.

At some point, the debug loop (steps 501-505) may be stopped at step 502, as for example, if the bug is found, or for any other reason. When the decision is made to stop the debug loop at step 502. A context for the PU 110 and associated SPUs 120a-h along with an mmap file exists as the result of executing program instructions on the simulator. These contexts may be saved from the simulator at step 540 and main memory 150 unmapped at step 550.

FIGS. 6A-D are a combined view of one embodiment of a combination of the debug processes of FIGS. 4 and 5, with details of the steps of interactions between the programs of the debug process: Kernel 610, Debugger 620, Program 630 to be debugged, and Simulator 640.

At step 610.1 Kernel 610 starts the debugger 620 (usually via a user typing the debugger command on the command line or clicking on an Icon). Then, at step 620.2 Debugger 620 starts by initializing and reading in Program 630 to be debugged.

At step 620.3 the user can set one or more breakpoints to help with the debug. Setting breakpoints may allow the user a chance to switch over Program 630 running on the hardware to running on Simulator 640. Before at step 620.4 Program 630 is started and at step 630.5 Program 630 initializes and starts running.

After program 630 starts running at step 630.5, at step 620.6 Debugger 620 waits for the breakpoint to be reached in Program 630 at step 630.7 after which at step 620.8 Debugger 620 will be notified of the breakpoint stop and the user can then request the Debugger 620 to switch context of Program 630 onto Simulator 640. Before doing this, the context may be saved from Program 630.

At step 620.9 Debugger 620 will launch Simulator 640 and wait for it to start (context saved in step 620.8 may be transmitted at this time, as well). At step 640.10 Simulator 640 will initialize and wait for Debugger 620 to request the Kernel 610 to save memory of the Program 630 at step 620.11.

At step 610.12 this system call is received by Kernel 610 which results in the memory currently assigned to Program 630 being transferred to Simulator 640. Kernel 610 may disallow Program 630 from executing since it no longer has any valid memory to usage.

While this is occurring, at step 640.13 Simulator 640 waits for Kernel 610 to get memory 150 ready. As does Debugger 620 at step 620.14. Once the transfer is completed by Kernel 610, Simulator 640 is notified that new memory has been assigned to it at step 610.15. At which point, at step 640.16 Simulator 640 reconfigures itself to handle the new memory assigned by the Kernel 610.

After this, at step 640.17 Simulator 640 lets the Debugger 620 know that it is ready for debugging, and at step 640.18 the user may start debugging the Program 630 as if it was on the hardware. During this, at step 640.19 actual Program 630 behavior is handled by Simulator 640, instead of PU 110 or SPU 120a-h.

At step 620.20, when the user is ready to switch back to hardware and enters the command to do so, then Debugger 620 will notify Simulator 640 to send context information at which point at step 640.21 Simulator 640 will dump necessary context back to Debugger 620.

At step 620.22, Debugger 620 will then ask the Kernel 610 to remap the memory from Simulator 640 back to Program 630. Kernel 610 will handle the system call at step 610.23 and make changes appropriately and then notifies the Simulator 640 that it no longer has memory mapping and at step 610.24, Debugger 620 that transfer is complete.

At this point, at step 620.25 Debugger 620 will close down Simulator 640 upon which at step 640.26 Simulator 640 will then stop running as told by the Debugger. Debugger 620 will then restore the context back into Program 630 at step 620.27. At step 620.28 Debugger 620 can detach the Program 630 to allow it to run freely on its own or, in one embodiment, program 630 may continue to be debugged until execution is stopped. Program 630 will then finish and runs to completion at step 630.29.

Note that in FIGS. 6A-D Simulator 640 does not have to run on the same processor that is executing Kernel 610, Program 630 or Debugger 620. That is, Simulator 640 could be running on SPU 120 while Kernel, Program and Debugger could be on PU 110 etc. If the memory 150 cannot be directly accessed by Simulator 640, then Kernel 610 may copy the contexts of the memory 150 into a form that can be accessed by Simulator 640. (E.g., if "simulator 640" is actually an FPGA emulator, then either the FPGA emulator may be configured to attach directly to the same Memory 150 or Kernel 610 may copy over Memory 15G into the FPGA emulator's own memory.)

Also with regards to FIGS. 6A-D, if the program is running on PU 110 and SPU 120, then the context may not only be PU 110 but also all the SPUs 120 being needed by the Program 630. In this case, the Simulator for PU 110 could be running on SPU 120a while Simulator for SPUs 120a-h could be running on 8 different PU 110 processors—all with access to the same Memory 150. Embodiments of the systems and methods of the present invention may also be utilized if SPU 120a was being simulated on another PU 110 processor, while SPU 120b was being simulated on an FPGA emulator, SPU 120c was running on an ICE hardware and the rest of SPUs 120d-f were running on another processing element 100's SPUs with RISCWatch probe attached (to allow scan based debugging of SPUs 120d-f).

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of debugging software, comprising:
    executing a first software program on a first processor;
    generating a first context during the execution of the first software program on the first processor wherein the first context comprises internal state of the first processor, first program and corresponding data, memory and registers;
    stopping the first processor and storing the first context;
    starting a first simulator process and providing the first context to the first simulator process, wherein the first simulator process executes on a second processor distinct from the first processor and the first simulator process is configured to simulate the first processor;
    executing the first software program on the simulated first processor using the first context; and
    debugging the first software program during the execution of the first software program on the simulated first processor.

2. The method of claim 1, wherein the first software program comprises a set of instructions, and wherein the set of instructions includes at least one instruction having a bug, and wherein first context is preserved prior to execution of the at least one instruction having a bug.

3. The method of claim 1, comprising
    generating a second context in the first simulator process wherein the second context is the context of the processor being simulated and comprises internal state of the first processor, first program and corresponding data, memory and registers;
    stopping the first simulator process on the second processor and storing the second context;
    providing the second context to the first processor; and
    executing the first software program on the first processor using the second context.

4. The method of claim 3, wherein the second context is generated by the first simulator process executing the first software program on the simulated first processor.

5. The method of claim 3, wherein the second context is the first context provided to the first simulator process to cause the first processor to execute the first software program from where it was previously stopped on the first processor.

6. The method of claim 3, further comprising:
    executing a second software program on a third processor;
    generating a third context during the execution of the second software program on the third processor wherein the third context comprises internal state of the third processor, second program and corresponding data, memory and registers;
    stopping the third processor and storing the third context;
    starting a second simulator process and providing the third context to the second simulator process, wherein the second simulator process executes on the second processor and the second simulator process is configured to simulate the third processor;
    executing the first software program on the simulated first processor using the first context and the second software program on the simulated third processor using the third context; and
    debugging the first software program during the execution of the first software program on the simulated first processor and debugging the second software program during the execution of the second software program on the simulated third processor.

7. The method of claim 6, wherein the third context is preserved prior to execution of the at least one instruction having a bug.

8. The method of claim 6, comprising
    generating a fourth context in the second simulator process wherein the fourth context is the context of the third processor being simulated and comprises internal state of the third processor, second program and corresponding data, memory and registers;
    stopping the second simulator process on the second processor and storing the fourth context;
    providing the fourth context to the third processor; and
    executing the second software program on the third processor using the fourth context.

9. The method of claim 1, further comprising providing a content of memory the first simulator process.

10. The method of claim 9, wherein said providing the content of memory comprises transferring control of memory from the first processor to the first simulator process.

11. The method of claim 9, wherein providing the content of memory comprises mapping the memory to the first simulator process.

12. A system for debugging software, said system comprising:
a first processor configured to
execute a first software program;
generate a first context during the execution of the first software program wherein the first context comprises internal state of the first processor, first program and corresponding data, memory and registers; and
stop the execution of the first software program, store the first context and provide the first context to a first simulator process; and
a second processor distinct from the first processor configured to:
start a first simulator process and receive the first context, wherein the first simulator process is configured to simulate the first processor;
execute the first software program on the simulated first processor using the first context; and
debug the first software program during the execution of the first software program on the simulated first processor.

13. The system of claim 12, wherein the first software program comprises a set of instructions, and wherein the set of instructions includes at least one instruction having a bug, and wherein the first processor is configured to preserve the first context prior to execution of the at least one instruction having a bug.

14. The system of claim 12, comprising:
the second processor is configured to:
generate a second context in the first simulator process wherein the second context is the context of the processor being simulated and comprises internal state of the first processor, first program and corresponding data, memory and registers;
stop the first simulator process and store the second context;
provide the second context to the first processor; and
the first processor is configured to execute the first software program using the second context.

15. The system of claim 14, the second context is generated by the first simulator process executing the first software program on the simulated first processor.

16. The system of claim 14, the second context is the first context provided to the first simulator process to cause the first processor to execute the first software program from where it was previously stopped on the first processor.

17. The system of claim 14, further comprising,
a third processor configured to:
execute a second software program;
generate a third context during the execution of the second software program wherein the third context comprises internal state of the third processor, second program and corresponding data, memory and registers;
stop the execution of the second software program, store the third context and provide the first context to a first simulator process; and wherein the second processor is configured:
start a second simulator process and receive the third context, wherein the second simulator process is configured to simulate the third processor;
execute the first software program on the simulated first processor using the first context and the second software program on the simulated third processor using the third context; and
debug the first software program during the execution of the first software program on the simulated first processor and debug the second software program during the execution of the second software program on the simulated third processor.

18. The system of claim 17, wherein the third context is preserved prior to execution of the at least one instruction having a bug.

19. The system of claim 18, wherein the second processor is configured to: generate a fourth context in the second simulator process wherein the fourth context is the context of the third processor being simulated and comprises internal state of the third processor, second program and corresponding data, memory and registers;
stop the second simulator process and store the fourth context;
provide the fourth context to the third processor; and
the third processor is configured to:
executing the second software program using the fourth context.

20. The system of claim 12, further comprising an operating system configured to provide a content of memory to the first simulator process.

21. The system of claim 20, wherein the operating system is configured to transfer control of memory to the first simulator process.

22. The system of claim 20, wherein the operating system is configured to map the memory to the first simulator process.

23. A method for debugging software comprising:
executing a first software program on a first processor;
generating a first context during the execution of the first software program on the first processor wherein the first context comprises internal state of the first processor, first program and corresponding data, memory and registers;
stopping the first processor and storing the first context;
starting a first simulator process and providing the first context to the first simulator process, wherein the first simulator process executes on a second processor distinct from the first processor and the first simulator process is configured to simulate the first processor;
executing the first software program on the simulated first processor using the first context;
debugging the first software program during the execution of the first software program on the simulated first processor;
generating a second context in the first simulator process wherein the second context is the context of the processor being simulated and comprises internal state of the first processor, first program and corresponding data, memory and registers;
stopping the first simulator process on the second processor and storing the second context;
providing the second context to the first processor; and
executing the first software program on the first processor using the second context.

* * * * *